(12) United States Patent
Woyjeck

(10) Patent No.: US 6,481,364 B2
(45) Date of Patent: Nov. 19, 2002

(54) ANCHORING DEVICE AND METHODS OF USE

(76) Inventor: James Woyjeck, 10621 Bloomfield Ave. #31, Los Alamitos, CA (US) 92720

( * ) Notice: Subject to any disclaimer, the term of this patent is extended or adjusted under 35 U.S.C. 154(b) by 0 days.

(21) Appl. No.: 09/909,184

(22) Filed: Jul. 19, 2001

(65) Prior Publication Data

US 2002/0007775 A1 Jan. 24, 2002

Related U.S. Application Data

(60) Provisional application No. 60/220,106, filed on Jul. 21, 2000.

(51) Int. Cl.[7] ............................................. B63B 21/24
(52) U.S. Cl. ..................... 114/294; 114/230.1; 52/157
(58) Field of Search ................................ 114/294, 295, 114/230.1; 52/156, 157

(56) References Cited

U.S. PATENT DOCUMENTS

| | | | | | |
|---|---|---|---|---|---|
| 4,960,064 A | * | 10/1990 | Mestas et al. | ......... | 114/230.26 |
| 5,699,864 A | * | 12/1997 | Dvorak et al. | .............. | 173/128 |
| 5,806,453 A | * | 9/1998 | Cook | ...................... | 114/230.1 |

* cited by examiner

*Primary Examiner*—Jesus D. Sotelo
(74) *Attorney, Agent, or Firm*—John J. Connors; Connors & Assoc. Inc.

(57) ABSTRACT

An anchoring device, adapted to be driven into the ground, is used to tether a floating vessel along a shore area, an animal or child, or an inanimate object. It includes an elongated hammer element and an elongated stake element in axial alignment and preferably assembled in a manner to enable relative axial and rotational movement between the hammer element and the stake element. Consequently, without disconnecting the assembled hammer and stake elements, the user axially raises and lowers the hammer element to strike with force the stake element to drive the stake element into the ground.

27 Claims, 5 Drawing Sheets

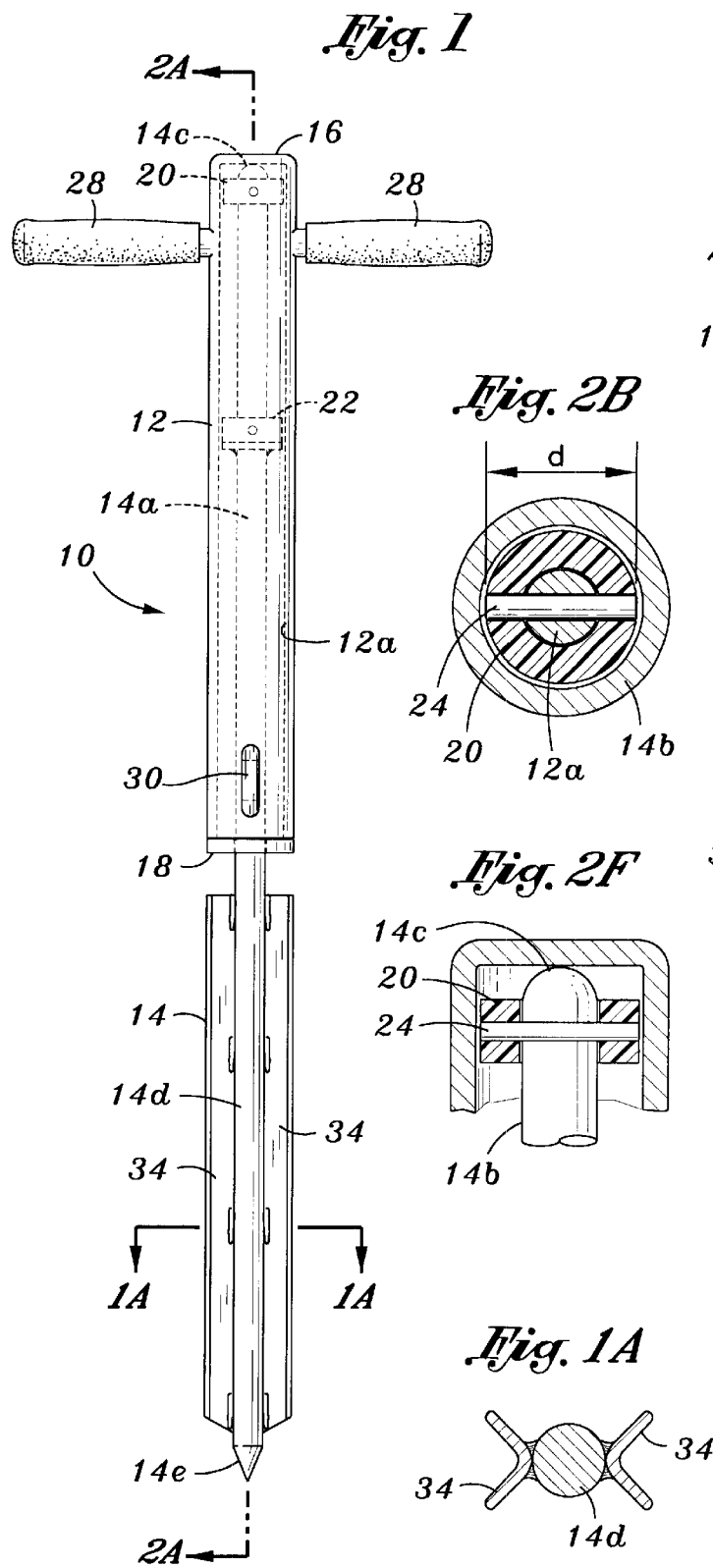
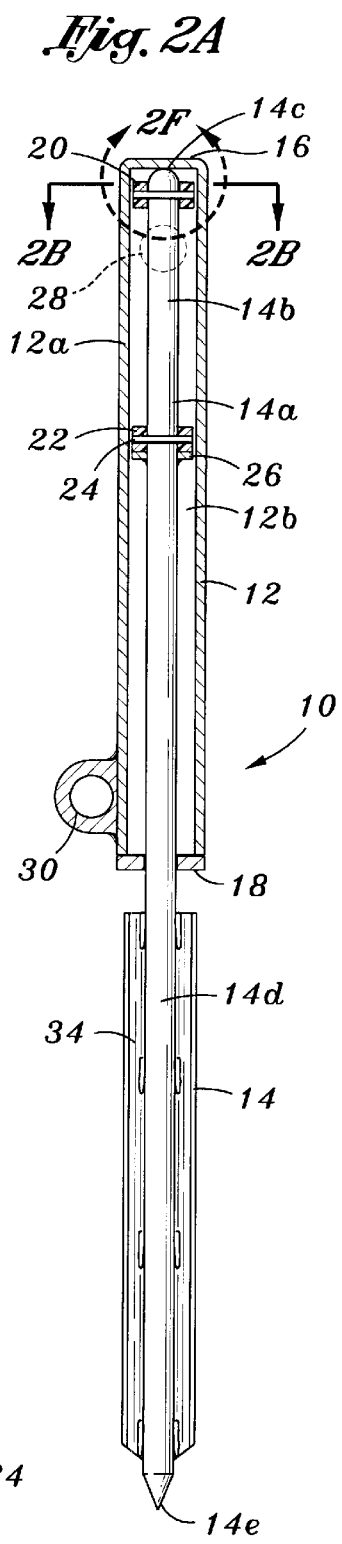

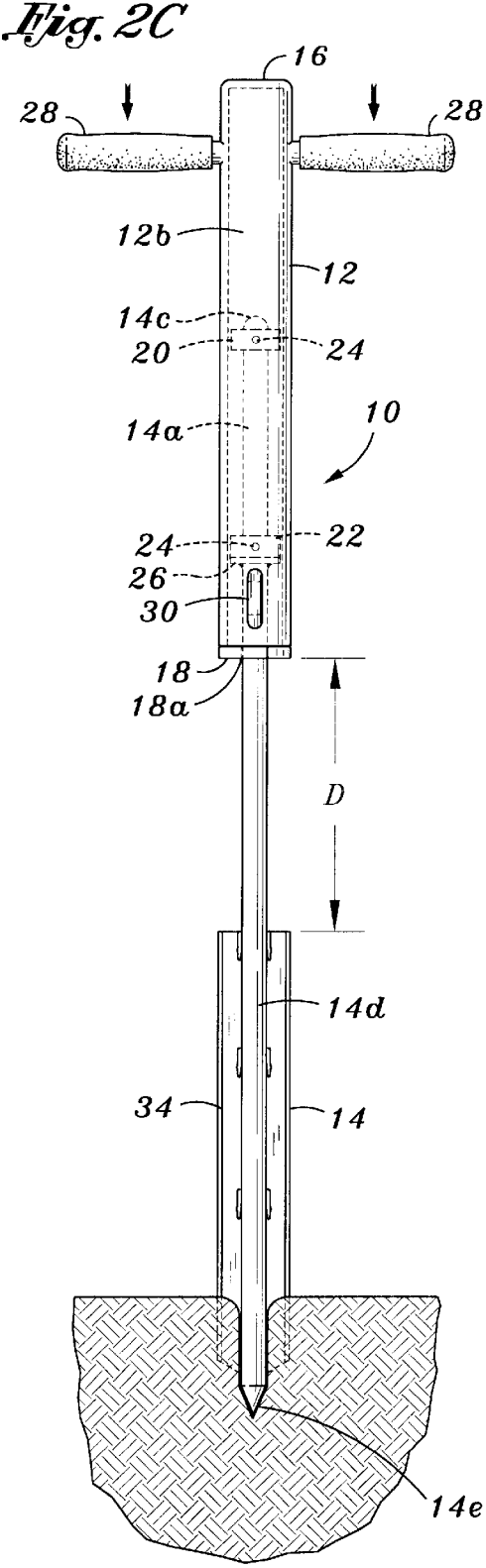
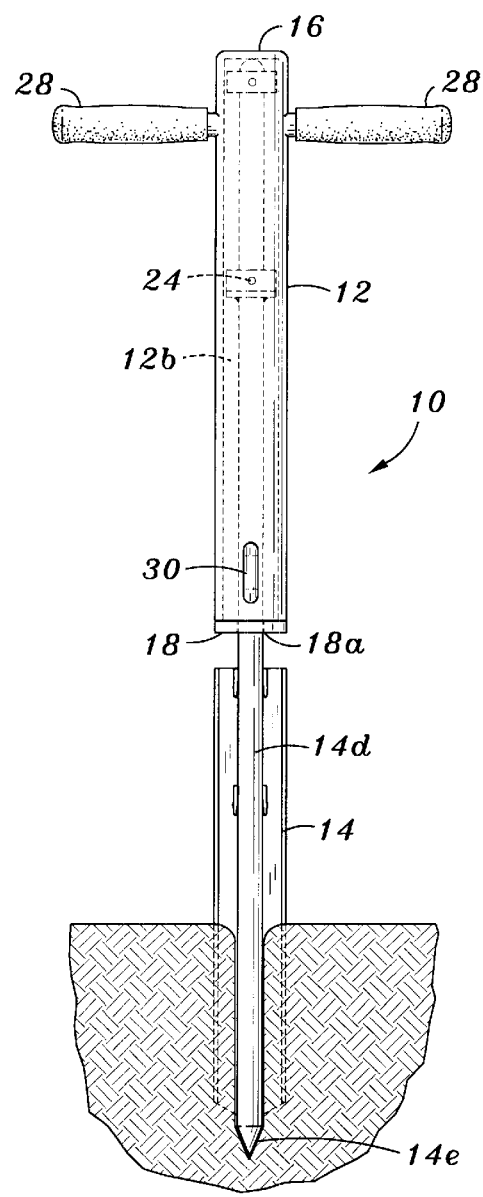

ANCHORING DEVICE AND METHODS OF USE

This application is a utility application based on U.S. provisional patent application Ser. No. 60/220,106, entitled "Anchoring Device & Methods Of Use," filed Jul. 21, 2000.

BACKGROUND OF THE INVENTION

There are many situations that require tethering an inanimate object, an animal, or a vessel in a desired location. For example, if one wishes to anchor a vessel such as a boat or personal watercraft near a shore area, one would typically drive a stake into the shore area adjacent the vessel and attach a line from the vessel to the stake. This requires the use of a hammer or other heavy object to drive the stake into the ground. Another problem is that the tide rises and falls, but the stake has a fixed length and could be pulled from the ground with a rising tide. Furthermore, the vessel tends to move sideways along the shoreline and the stake does not rotate in response to this sideways movement. It is also desirable to secure an animal, a child, or an inanimate object such as, for example, an airplane in particular locations. Again, the same problem presents itself, namely, that a hammer or other heavy object is needed to drive the stake into the ground. Moreover, the stake does not accommodate movement around the stake other than wrapping around the stake the line securing the animal or child. In some situations this results in the line becoming entangled.

SUMMARY OF THE INVENTION

It is the object of this invention to provide an anchoring device comprising a single unit containing a hammer element and a stake element that cooperate with each other, allowing the entire unit to change length, and at least in the most preferred embodiment, allowing for rotation of the hammer element with respect to the stake element driven into the ground.

This invention has several features, no single one of which is solely responsible for its desirable attributes. Without limiting the scope of this invention as expressed by the claims that follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include, but are not limited to, ease of manufacture, low cost, convenience of use, a variable length of the anchoring device, and rotation movement between the stake and hammer elements.

The first feature of the anchoring device of this invention is that it includes a hammer element and a stake element, each having a longitudinal axis and connected together with their respective longitudinal axes aligned and at least partially coextensive. The hammer element comprises a tubular member with opposed and closed top and bottom ends. The bottom end has an opening therein that allows an upper portion of the stake element to pass through it and allows the hammer and stake elements move axially relative to each other. There is at least one stop element fixedly attached to the upper portion of the stake element. This stop element upon engaging an end of the hammer element prevents further axial movement in a selected direction.

The second feature is the use of two stop elements and alignment bushings. The stake element has a distal end that is pointed and a proximal end that serves as a second stop element for engaging the top end of the hammer element. The tubular member has a predetermined inside cross-sectional size and configuration and there are a pair of spaced apart bushing members fixedly attached to a section of the upper portion of the stake element. The bushing members each have a cross-sectional size and configuration that is substantially the same as the inside cross-sectional size and configuration of the tubular member. This enables the hammer and stake elements to move relative to each other and maintain the alignment of their longitudinal axes. Preferably, the hammer element and stake element are mounted to rotate relative to each other. This is achieved when the inside cross-sectional size and configuration of the tubular member and the bushings are circular. Specifically, the tubular member is a hollow cylinder and the bushings are cylinders with diameters slightly less than the diameter of the tubular member.

The third feature is that the hammer element and stake have certain preferred characteristics. Preferably, the hammer element has at least one handle member extending therefrom, and at least one attachment member extending therefrom. The attachment member may simply be an eyelid or loop to which a line is attached. Preferably, the stake element has at least one side with a barb element thereon. This barb element assists in holding the stake element in the ground.

The fourth feature is the dimensions of the anchoring device. The hammer element and the stake element are able to move relative to each other a minimum distance of at least about 5 inches, preferably from about 7 to about 24 inches. Preferably, the tubular member has the shape of a hollow cylinder with an inside diameter of from about 1½ to about 6 inches. The hammer element has a length of from about 8 to about 30 inches, and the stake element has a length of from about 8 to about 36 inches.

This invention also includes methods of using the anchoring device to tether a floating vessel along a shore area, to tethering to ground an animal or a child, and to tether to ground an inanimate object.

The method of tethering a floating vessel along a shore area, comprises
 (a) providing an anchoring device including unitary, self contained hammer and stake elements in an assembly that enables relative axial movement between the hammer and the stake elements,
 (b) axially raising and lowering the hammer element to strike with force the stake element, driving said stake element into the shore area, and
 (c) attaching a line from the vessel to the anchoring device.

The method of tethering to ground an animal or a child, comprises
 (a) providing an anchoring device unitary, self contained hammer and stake elements in an assembly that enables relative axial and rotational movement between the hammer element and the stake element,
 (b) axially raising and lowering the hammer element to strike with force the stake element, driving said stake element into the ground, and
 (c) attaching a line from the animal or the child to the anchoring device.

The method of tethering to ground an inanimate object, comprises
 (a) providing an anchoring device including unitary, self contained hammer and stake elements in an assembly that enables relative axial movement between the hammer element and the stake element, (b) axially raising and lowering the hammer element to strike with force the stake element, driving said stake element into the ground, and (c) attaching a line from the inanimate object to the anchoring device.

DESCRIPTION OF THE DRAWING

The preferred embodiments of this invention, illustrating all its features, will now be discussed in detail. These embodiments depict the novel and non-obvious anchoring device of this invention and methods of use thereof as shown in the accompanying drawing, which is for illustrative purposes only. This drawing includes the following figures (FIGS.), with like numerals indicating like parts:

FIG. 1 is a side elevational view of the anchoring device of this invention, showing in phantom lines the hammer element in a neutral position prior to driving the stake element into the ground.

FIG. 1A is a cross-sectional view taken along line 1A—1A of FIG. 1.

FIG. 2A is a cross-sectional view taken along line 2A—2A of FIG. 1.

FIG. 2B is a cross-sectional view taken along line 2B—2B of FIG. 2A.

FIG. 2C is a side elevational view showing in phantom lines the hammer element at the top of its upstroke with the stake element in an initial position partially driven into the ground.

FIG. 2D is a side elevational view similar to FIG. 1, showing the hammer element at the bottom of its down stroke and the stake element driven deeper into the ground from that shown in FIG. 2C.

FIG. 2F is an enlarged fragmentary view taken along line 2F of FIG. 2A.

DETAILED DESCRIPTION OF THE PREFERRED EMBODIMENTS

Figure 2E:
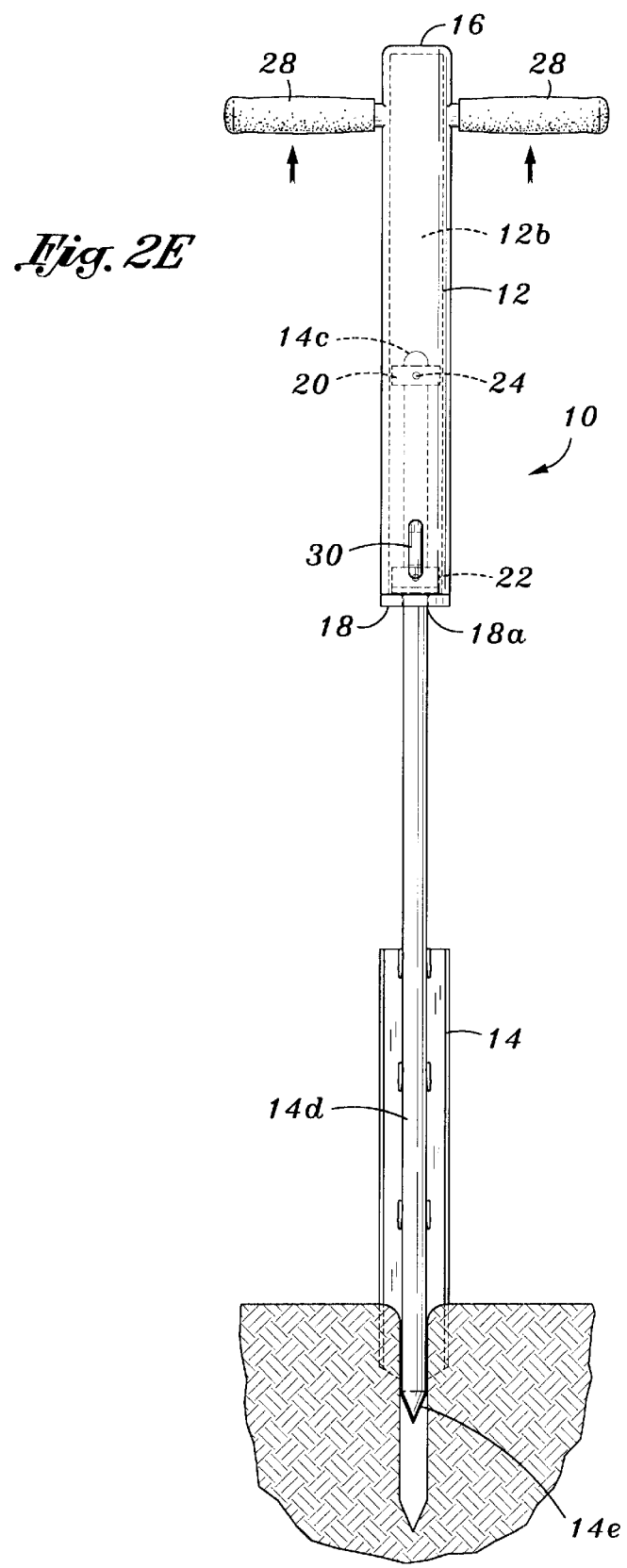
FIG. 2E is a side elevational view, showing the hammer element at the top of its upstroke when the stake element is being removed from the ground.

As best shown in FIGS. 1A and 2A through 2F, the anchoring device 10 of this invention includes a hammer element 12 connected to a stake element 14 to form a single, self-contained unit. Preferably, it is made of steel and brightly colored. The hammer element 12 comprises a tubular member 12a, preferably having a hollow cylindrical configuration with a circular cross-sectional configuration and having inside diameter d of from about 1½ to about 6 inches. An upper portion 14a of the stake element 14 extends into a hollow internal compartment 12b of the hammer element 12b. This hollow internal compartment 12b is formed when a top end cap 16 and a bottom end cap 18 are welded in position. The bottom end cap 18 has an opening 18a therein centrally located to allow the upper portion 14a of the stake element 14 to extend into the compartment 12b. Preferably, the hammer element 12 has a length of from about 8 to about 30 inches and the stake element 14 has a length of from about 8 to about 36 inches.

The tubular member 12a and the stake element 14 each have a longitudinal axis which are aligned and coextensive. A shaft section 14b of the stake element 14 has a pair of spaced apart bushings 20 and 22, each being secured in a fixed position on the shaft section by pressed-fit pins 24. Each pin 24 extends through the bushings and the shaft section 14b. The bushings 20 and 22 thus cannot move axially along the stake element 14. There is a washer 26 welded to the shaft section 14b directly beneath the bushing 22 and between this bushing and the bottom end cap 18. This washer 26 serves as a first stop element and impacts the bottom end cap 18 upon raising the hammer element 12 to its top maximum upstroke position as best shown in FIG. 2E. The tip 14c of shaft section 14b extends slightly beyond the bushing 20. This tip 14c serves as the second stop element and impacts the top end cap 16 upon lowering the hammer element 12 to its bottom maximum down stroke position as best shown in FIG. 2D.

The bushings 20 and 22 each have a cross-sectional configuration substantially identical to the cross-sectional configuration of the hollow compartment 12b. In this case, they are both circular, with the diameter of the bushings 20 and 22 being slightly less than the diameter of the internal, circular compartment 12b. This arrangement enables the hammer element 12 to move axially and to rotate with respect to the stake element 14 when the stake element is driven into the ground.

Extending outwardly from the upper end of the tubular member 12a is a pair of aligned handlebars 28. Near the bottom along the exterior of the tubular member 12a is an attachment eyelid or loop 30 for tying a line 32 or other tethering device to the hammer element 12. The lower portion 14d of the stake element 14 terminates in a pointed distal end 14e and along the sides are opposed V-shaped barb members 34 welded in place that facilitate holding the stake element in the ground.

In the preferred embodiment of the anchoring device 10, the hammer element 12 and the stake element 14 are able to move relative to each other a minimum distance D (FIG. 2c) of at least about 5 inches.

In operation, as depicted in FIG. 2C, the user positions anchoring device 10 at the desired location with the stake element 14 being oriented vertically and the hammer element 14 in a raised position. Grasping a handlebar 28 in each hand, the user then slams the hammer element 12 into the top end of the stake element 14, moving the hammer element downward until the tip 14c of the stake element 14 strikes the top end cap 16 of the hammer element. This forces the distal end 14e of the stake element 14 into the ground. The user then, in a more gentle manner, pulls the hammer element 12 upward until the bottom end cap 18 gently contacts the stop washer 26. This is the maximum position of the upstroke depicted in FIG. 2C. The user then again slams the hammer element 12 downward, with the tip 14c again striking the top end cap 16 of the hammer element. This action is repeated until the stake is driven into the ground to the desired depth. To remove the stake element 14, instead of gently pulling the hammer element 12 upward, the user pulls the hammer element 12 upward quickly and forcefully so that bottom end cap 18 strikes with power the stop washer 26. This lifts the stake element 14 from the ground as depicted in FIG. 2E.

Figure 3:
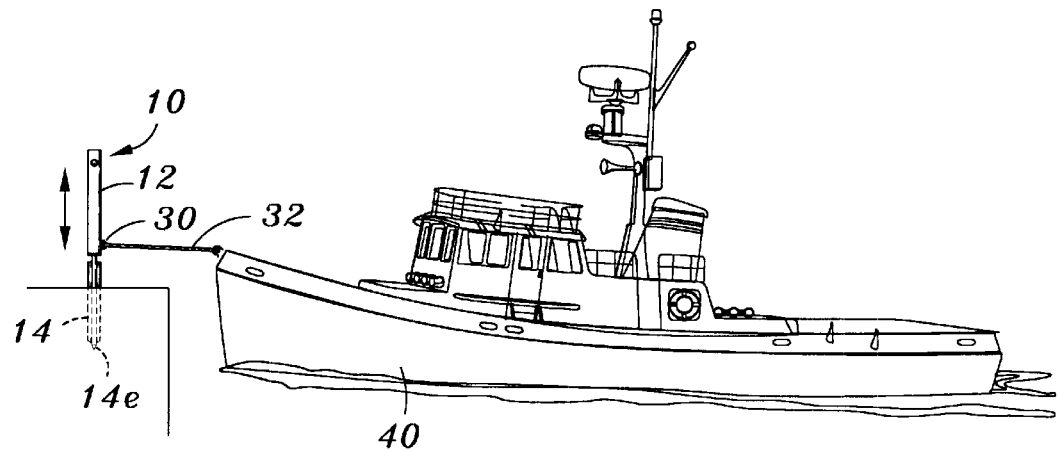
FIG. 3 is a side view showing the anchoring device used to tether the vessel to the shore area.

As shown in FIG. 3, one advantageous application of the anchoring device 10 is to tether a vessel 40 to a shore area. A line, for example a rope 32, having one end attached to the bow of the vessel has its other end secured to the attachment loop 30. As the tide rises, the hammer element 12 will be pulled upward. The distance the hammer element 12 can move upward is determined by the distance D depicted in FIG. 2C. If the vessel moves sideways along the shoreline, the hammer element 12 will rotate with respect to the stake element 14. Although a vessel 40 is depicted, the anchoring device 10 may find greater application with personal watercraft, which is considered a vessel for the purposes of this invention.

Figure 4:
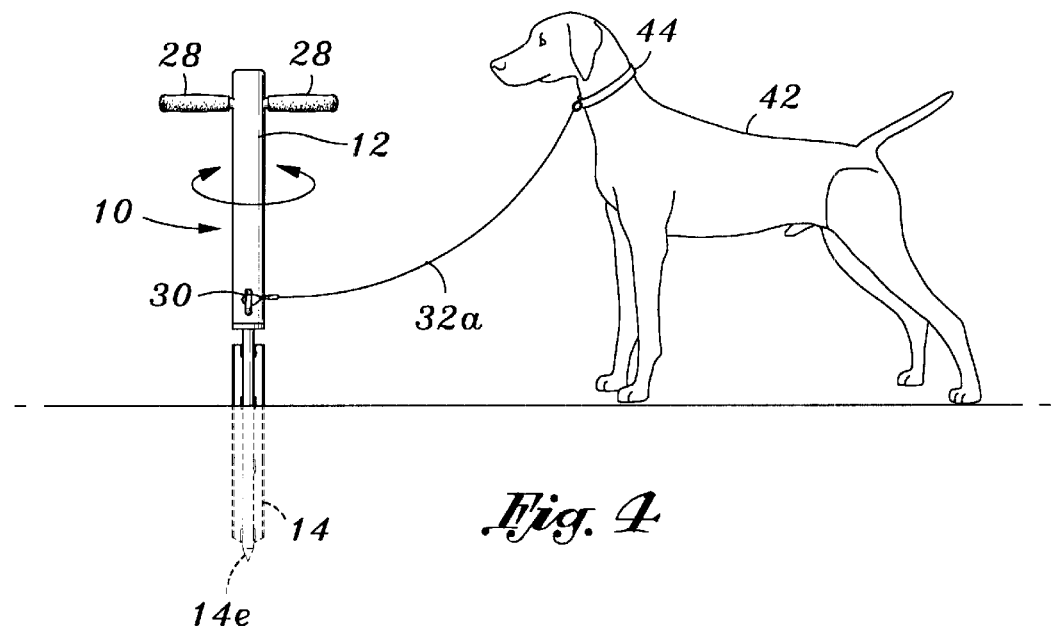
FIG. 4 is a side view showing the anchoring device of this invention used to tether a dog.

As shown in FIG. 4, the anchoring device 10 can be used to tether an animal such as, for example, a dog 42. One end of a leash 32a is attached to a collar 44 on the dog's neck and the other end of the leash is connected to the attachment loop 30. The dog 42 can move either in a clockwise or counter-clockwise direction, with the hammer element 12 rotating with respect to the stake element 14. Thus, the leash 32a is not entangled.

Figure 5:
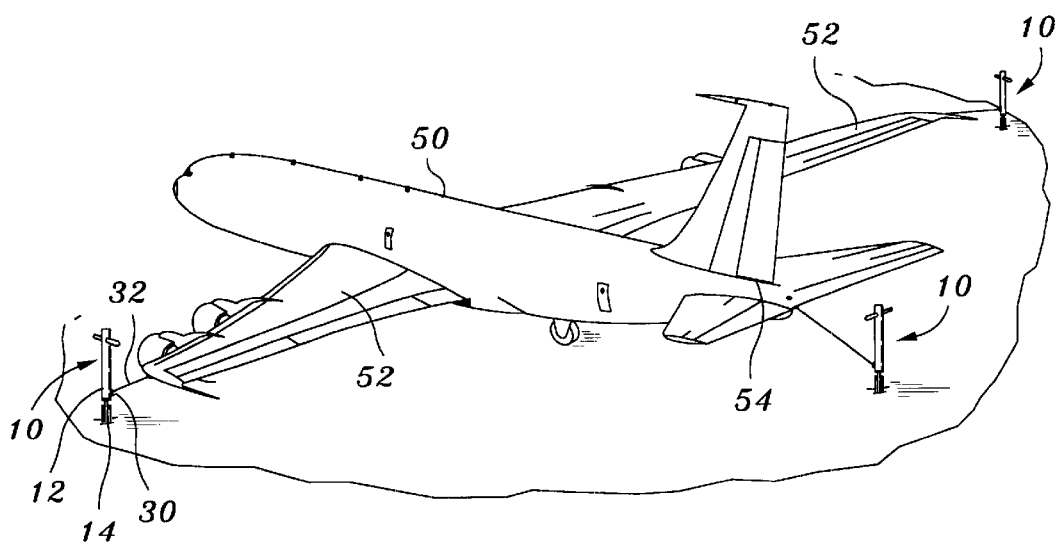
FIG. 5 is a perspective view showing three anchoring devices of this invention used to tether an airplane.

As shown in FIG. 5, the anchoring device 10 may also be used to tether an inanimate object, for example, an airplane 50 where more than one anchoring device is used. As illustrated, there is one anchoring device 10 tethered to the end of each wing 52 and a third anchoring device 10 tethered to the tail 54 of the airplane 50.

Figure 6:
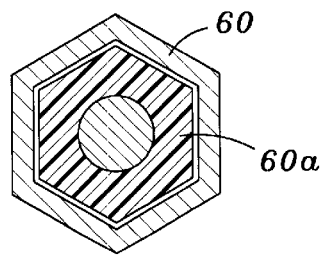
FIG. 6 is a cross-sectional view similar to FIG. 2B showing a tubular member having a hexagonal cross-sectional configuration.
Figure 7:
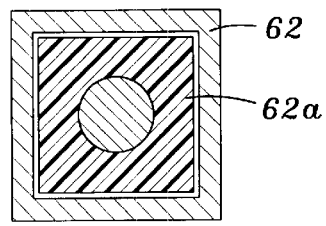
FIG. 7 is a cross-sectional view similar to FIG. 2B showing a tubular member with a rectangular cross-sectional configuration.

As shown in FIGS. 6 and 7, the cross-sectional configuration of the tubular member 12a need not be circular. The advantage of the circular cross-sectional area is to allow the hammer element 12 to rotate with respect to the stake element 14. In certain situations this may not be necessary, for example when tethering the airplane 50 shown in FIG. 5. Here the tubular member could have a different configuration. For example, a hexagonal tubular member 60 as shown in FIG. 6, or rectangular tubular member 62, for example, a square, as shown in FIG. 7. In such cases the bushings 60a and 62a would have a complementary configuration, that is, a hexagonal bushing 60a used with the hexagonal tubular member 60 and a square bushing 62a used with the square tubular member 62.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. An anchoring device, including
    a hammer element and a stake element, each having a longitudinal axis and connected together with their respective longitudinal axes aligned,
    said hammer element comprising a tubular member with opposed and closed top and bottom ends, said bottom end having an opening therein,
    said stake element having an upper portion and a lower portion, said upper portion extending at least partially through the opening in the bottom end of the hammer element to allow the hammer element and stake element to move axially relative to each other, and
    at least one stop element fixedly attached to a section of the upper portion, said stop element upon engaging an end of the hammer element preventing further axial movement in a selected direction,
    said tubular member having a predetermined inside cross-sectional size and configuration and there are a pair of spaced apart bushing members fixedly attached to the section of the upper portion of the stake element, said bushing members each having a cross-sectional size and configuration that is substantially the same as the inside cross-sectional size and configuration of the tubular member to enable the hammer and stake elements to move relative to each other and maintain the alignment of their longitudinal axes.

2. The anchoring device according to claim 1 where the hammer element has at least one handle member extending therefrom.

3. The anchoring device according to claim 1 where the hammer element has at least one attachment member extending therefrom.

4. The anchoring device according to claim 1 where the hammer element and the stake element are able to move relative to each other a minimum distance of at least 5 inches.

5. The anchoring device according to claim 1 where the tubular member has the shape of a hollow cylinder with an inside diameter of 1½ to 6 inches.

6. The anchoring device according to claim 1 the hammer element has a length of from 8 to 30 inches.

7. The anchoring device according to claim 1 the stake element has a length of from 8 to 36 inches.

8. The anchoring device according to claim 1 the hammer element and stake element mounted to rotate relative to each other.

9. The anchoring device according to claim 1 where the stake element has at least one side with barb elements thereon.

10. An anchoring device, including
    a hammer element and a stake element, each having a longitudinal axis and connected together with their respective longitudinal axes aligned and at least partially coextensive,
    said hammer element having at least one attachment member extending therefrom, at least one handle member extending therefrom, and comprising a tubular member with opposed closed top and bottom ends, said bottom end having an opening therein and said tubular member having a predetermined inside cross-sectional size and configuration,
    said stake element having a upper portion and lower portion, said upper portion extending at least partially through the opening in the bottom end of the hammer element and having a pair of spaced apart bushing members fixedly attached to a section of the upper portion, one bushing member being closer to the bottom end of the tubular member than the other bushing member,
    said bushing members each having a cross-sectional size and configuration that is substantially the same as the inside cross-sectional size and configuration of the tubular member to enable the hammer and stake elements to move relative to each other and maintain the alignment of their longitudinal axes, a stop element fixedly attached to the section of the upper portion of the stake element between the bottom end of the tubular member and said bushing member closer to said bottom end and positioned to enable the hammer and stake elements to move relative to each other a minimum distance of at least 5 inches, said stop element upon engaging the bottom end of the hammer element preventing further axial movement in a direction towards said bottom end direction.

11. The anchoring device according to claim 10 where the stake element has a distal end that is pointed and a proximal end that serves as a second stop element for engaging the top end of the hammer element.

12. The anchoring device according to claim 10 where the tubular member has the shape of a hollow cylinder with an inside diameter of from 1½ to 6 inches, the bushing members have a circular cross-sectional configuration with a diameter slightly less than the diameter of the hollow cylinder, and the hammer element and stake element are mounted to rotate relative to each other.

13. The anchoring device according to claim 10 the hammer element has a length of from 8 to 30 inches.

14. The anchoring device according to claim 13 the stake element has a length of from 8 to 36 inches.

15. An anchoring device adapted to be driven into the ground, including an elongated hammer element and an elongated stake element in axial alignment and assembled in a manner to enable relative axial and rotational movement between the hammer element and the stake element, whereby, without disconnecting the assembled hammer and stake elements, axially raising and lowering the hammer element to strike with force the stake element to drive said stake element into the ground, said hammer element having at least one handle member extending therefrom and at least one attachment member extending therefrom, and said stake element having a first stop attached thereto positioned to engage one end of the hammer element, a distal end that is pointed, and a proximal end that serves as a second stop element for engaging the another end of the hammer element, said hammer element comprising a tubular member having a predetermined inside cross-sectional size and configuration and there are a pair of spaced apart bushing members fixedly attached to a section of the stake element received within the hammer element, said bushing members each having a cross-sectional size and configuration that is substantially the same as the inside cross-sectional size and configuration of the tubular member to enable the hammer and stake elements to move relative to each other and maintain the alignment of their longitudinal axes.

16. An anchoring device adapted to be driven into the ground, including a hammer element and a stake element connected together to enable the hammer element to move through a down stroke and an upstroke, first and second spaced apart, aligned bushing members, the first bushing member being lower than the second bushing member when the anchoring device is substantially vertically oriented to drive said stake element into the ground, at least one of said bushing members serving as guide for the hammer element as it moves through its upstroke and down stroke, said hammer element engaging a first portion of the stake element on the down stroke to drive the stake element into the ground and engaging the first bushing on the upstroke to remove the stake element from the ground.

17. The anchoring device according to claim 16 where the hammer and stake elements to move relative to each other a minimum distance of at least 5 inches.

18. The anchoring device according to claim 16 where said hammer element includes at least one handle member extending therefrom substantially at a right angle to said hammer element.

19. The anchoring device according to claim 16 where the stake element has a distal end that is pointed and a proximal end that serves as a stop element that engages the hammer element on the down stroke.

20. The anchoring device according to claim 16 where the bushing members have a circular cross-sectional configuration.

21. The anchoring device according to claim 16 where the hammer element and stake element are mounted to rotate relative to each other.

22. The anchoring device according to claim 16 where the hammer element has a length of from 8 to 30 inches.

23. The anchoring device according to claim 16 where the stake element has a length of from 8 to 36 inches.

24. An anchoring device adapted to be driven into the ground, including a hammer element and a stake element connected together to rotate relative to each other, with the hammer element mounted to move axially through a down stroke and an upstroke a minimum distance of at least 5 inches, said stake element having a distal end that is pointed and a proximal end that serves as a stop element that engages the hammer element on the down stroke, at least one handle member extending from the hammer element substantially at a right angle to said hammer element, first and second spaced apart, aligned bushing members, the first bushing member being lower than the second bushing member when the anchoring device is substantially vertically oriented to drive said stake element into the ground, at least one of said bushing members serving as guide for the hammer element as it moves through its upstroke and down stroke, said hammer element engaging the proximal end of the stake element on the down stroke to drive the stake element into the ground and engaging the first bushing on the upstroke to remove the stake element from the ground.

25. The anchoring device according to claim 24 where the bushing members have a circular cross-sectional configuration.

26. The anchoring device according to claim 25 where the hammer element has a length of from 8 to 30 inches.

27. The anchoring device according to claim 26 where the stake element has a length of from 8 to 36 inches.

* * * * *